United States Patent
Lee et al.

(10) Patent No.: US 12,489,115 B2
(45) Date of Patent: Dec. 2, 2025

(54) NEGATIVE ELECTRODE ACTIVE MATERIAL FOR LITHIUM ION SECONDARY BATTERY, NEGATIVE ELECTRODE, AND LITHIUM ION SECONDARY BATTERY INCLUDING THE SAME

(71) Applicant: SK INNOVATION CO., LTD., Seoul (KR)

(72) Inventors: Mi Ryeong Lee, Daejeon (KR); Jong Hyuk Lee, Daejeon (KR); Hee Gyoung Kang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 509 days.

(21) Appl. No.: 17/573,549

(22) Filed: Jan. 11, 2022

(65) Prior Publication Data
US 2022/0223864 A1    Jul. 14, 2022

(30) Foreign Application Priority Data
Jan. 11, 2021 (KR) .................. 10-2021-0003515

(51) Int. Cl.
*H01M 4/583* (2010.01)
*H01M 4/04* (2006.01)
*H01M 4/36* (2006.01)
*H01M 4/38* (2006.01)
*H01M 10/0525* (2010.01)
*H01M 4/02* (2006.01)

(52) U.S. Cl.
CPC ......... *H01M 4/583* (2013.01); *H01M 4/0404* (2013.01); *H01M 4/366* (2013.01); *H01M 4/386* (2013.01); *H01M 10/0525* (2013.01); *H01M 2004/027* (2013.01)

(58) Field of Classification Search
CPC .... H01M 4/583; H01M 4/0404; H01M 4/366; H01M 4/386; H01M 10/0525; H01M 2004/027
USPC ...................................... 429/231.8
See application file for complete search history.

(56) References Cited

U.S. PATENT DOCUMENTS

| | | | |
|---|---|---|---|
| 9,130,231 B2 | 9/2015 | Halalay et al. | |
| 2014/0255779 A1* | 9/2014 | Min | H01M 10/0585 429/211 |
| 2014/0329143 A1* | 11/2014 | Halalay | H01M 10/0525 525/379 |
| 2015/0364791 A1* | 12/2015 | Vu | H01M 4/366 429/306 |
| 2018/0159132 A1* | 6/2018 | Gonser | H01M 4/366 |
| 2018/0331386 A1* | 11/2018 | Koh | C08J 7/05 |
| 2018/0375089 A1 | 12/2018 | Gonser et al. | |
| 2020/0058955 A1* | 2/2020 | Asakawa | C07F 13/005 |

FOREIGN PATENT DOCUMENTS

| | | |
|---|---|---|
| DE | 102016224044 A1 * | 6/2018 |
| JP | 2018-174038 A | 11/2018 |
| KR | 10-2018-0063853 A | 6/2018 |
| KR | 10-2020-0010297 A | 1/2020 |

OTHER PUBLICATIONS

Bai L et al., Enhanced Performance in Gas Adsorption and Li Ion Battery by Docking Li+ in Crown Ether-Based Metal-1 Organic Framework, Chemical Communications, The Royal Society of Chemistry 2012, Jan. 12, 2016.
Office Action for Korean Patent Application No. 10-2021-0003515 issued by the Korean Intellectual Property Office (KIPO) on Jul. 1, 2025.

\* cited by examiner

*Primary Examiner* — Nicholas A Smith
*Assistant Examiner* — Kevin Nguyen
(74) *Attorney, Agent, or Firm* — IP & T GROUP LLP

(57) ABSTRACT

The present disclosure relates to a negative electrode active material for a lithium ion secondary battery, a negative electrode, and a lithium ion secondary battery including the same. In the present disclosure, a crown ether-based host material which is a compound allowing selective coordination bonding with a lithium ion and having a similar cavity size to ions is included in the negative electrode active material, thereby suppressing lithium precipitation on the surface of the negative electrode active material to improve high rate charge/discharge characteristics of the battery, and also the crown ether-based host material solution is coated on the negative electrode active material layer of the battery to facilitate migration of lithium ions at high rate to improve an insertion/extraction speed of lithium ions during charge/discharge of the battery.

12 Claims, No Drawings

NEGATIVE ELECTRODE ACTIVE MATERIAL FOR LITHIUM ION SECONDARY BATTERY, NEGATIVE ELECTRODE, AND LITHIUM ION SECONDARY BATTERY INCLUDING THE SAME

CROSS-REFERENCE TO RELATED APPLICATIONS

This application claims priority under 35 U.S.C. § 119 to Korean Patent Application No. 10-2021-0003515, filed on Jan. 11, 2021, in the Korean Intellectual Property Office, the disclosure of which is incorporated herein by reference in its entirety.

TECHNICAL FIELD

The following disclosure relates to a negative electrode active material for a lithium ion secondary battery, a negative electrode, and a lithium ion secondary battery including the same.

BACKGROUND

Recently, as an issue of global warming arises, a demand for environmentally friendly technologies is rapidly increasing in response thereto. In particular, according to the growth of a medium and large-sized battery market used in an electric vehicle, an energy storage system (ESS), and the like, it is a trend that high energy density, high safety, and high output characteristics are required in the battery as such, and a technical demand therefor increases and a demand for a lithium ion secondary battery which is spotlighted as an energy storage device is also explosively increasing.

Among negative electrode active materials used in the lithium ion secondary battery, existing commercialized materials include graphite-based materials such as natural graphite and artificial graphite and carbon-based materials. The graphite-based materials have low energy density of a battery due to a low theoretical capacity of graphite (372 mAh/g) and have a reaction potential similar to a lithium metal which results in poor high rate characteristics, and the carbon-based materials have various insertion/extraction potentials of lithium ions and react at a high potential to have excellent high rate characteristics, but have a limitation of a low capacity.

Since an existing lithium ion secondary battery has high structural stability, a graphite-based negative electrode active material allowing lithium ions to be reversibly inserted/extracted is mainly used for the lithium ion secondary battery, but the reaction potential of the graphite-based material is similar to a lithium metal, and thus, there is a limitation in application to a case requiring high output characteristics such as an electric tool and an electric vehicle, due to the problems of an electrolyte side reaction at a high rate and in a lithium insertion/extraction speed, and the like. In addition, the solution to the problems is limited in improving the lithium ion insertion/extraction speed by coating amorphous carbon on the surface of a graphite-based negative electrode active material.

SUMMARY

Thus, the present inventors completed the present disclosure, in order to distribute a material facilitating lithium ion migration as compared with an existing negative electrode uniformly, thereby providing a negative electrode having excellent high rate charge/discharge characteristics. The present inventors found that a crown ether-based host material layer is formed by including a crown ether-based compound which is an organic material allowing selective coordination of lithium ions in a negative electrode active material composition and also coating the crown ether-based compound on a negative electrode active material layer to form a crown ether-based host material layer, thereby improving an insertion/extraction speed of lithium ions and suppressing lithium precipitation on the surface to improve high rate charge/discharge characteristics.

An embodiment of the present invention may be realized by providing a negative electrode active material for a lithium ion secondary battery. Another embodiment of the present invention may be realized by providing a negative electrode for a lithium ion secondary battery including the negative electrode active material for a lithium ion secondary battery.

Another embodiment of the present invention may be realized by providing a manufacturing method of a negative electrode for a lithium ion secondary battery.

Still another embodiment of the present invention may be realized by providing a lithium ion secondary battery including the negative electrode for a lithium ion secondary battery.

In order to achieve the above object, the present disclosure provides a negative electrode active material for a lithium ion secondary battery, and a negative electrode and a lithium ion secondary battery including the same.

In one general aspect, a negative electrode active material for a lithium ion secondary battery is provided.

The negative electrode active material for a lithium ion secondary battery of the present disclosure includes: a core layer including a metal-based or inorganic non-metal-based material; and a coating layer including a crown ether-based host material.

The metal-based or inorganic non-metal-based material of the core layer of the negative electrode active material for a lithium ion secondary battery may be one or more selected from the group consisting of carbon (C), silicon (Si), and a mixture thereof.

The crown ether-based host material of the coating layer of the negative electrode active material for a lithium ion secondary battery may be a cyclic compound including two or more alkylene oxide units represented by the following Chemical Formula 1:

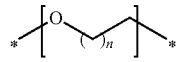

[Chemical Formula 1]

wherein n is an integer of 1 to 3.

The crown ether-based host material included in the coating layer may be a compound containing an oxygen atom (O) in a macrocyclic ring, a compound containing one or more nitrogen atoms (N) or sulfur atoms (S) in the macrocyclic ring, or a compound containing an ester or amide bond in one macrocyclic ring, and for example, may have the following structures:

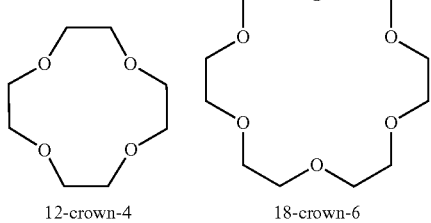

12-crown-4  18-crown-6

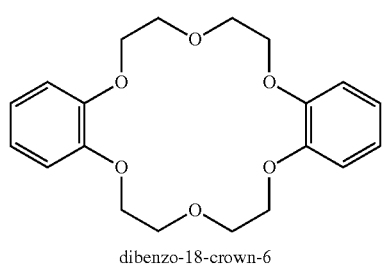

dibenzo-18-crown-6

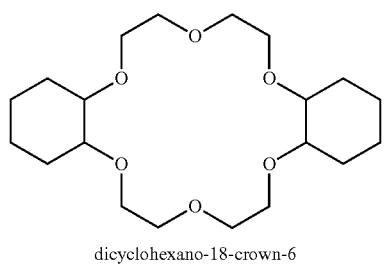

dicyclohexano-18-crown-6

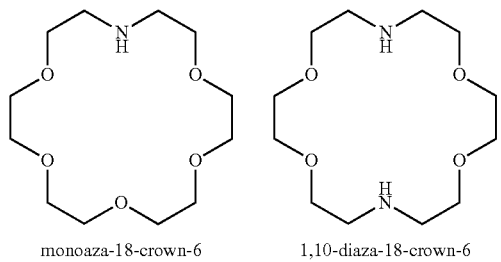

monoaza-18-crown-6   1,10-diaza-18-crown-6

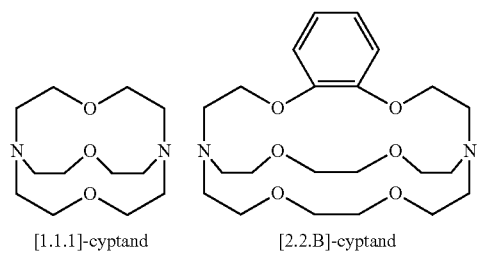

[1.1.1]-cyptand   [2.2.B]-cyptand

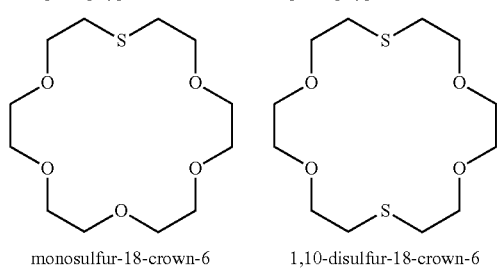

monosulfur-18-crown-6   1,10-disulfur-18-crown-6

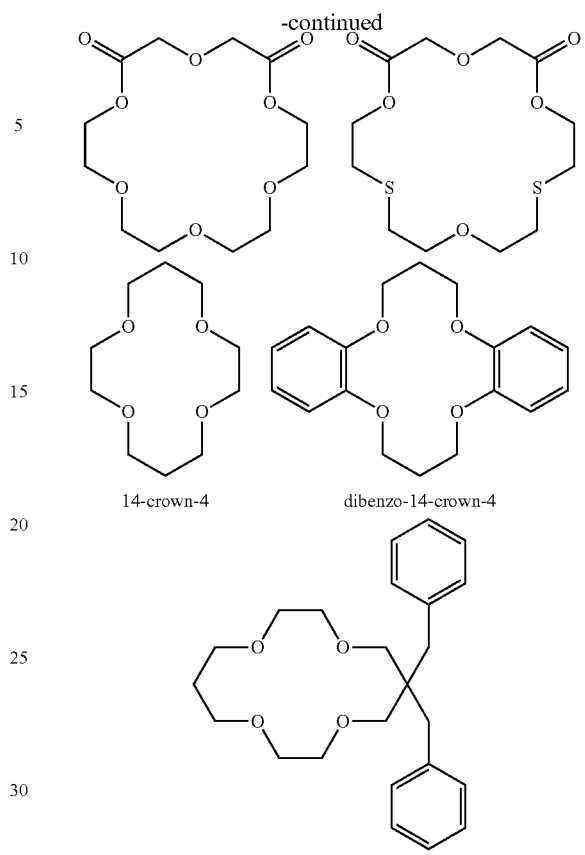

14-crown-4   dibenzo-14-crown-4

The crown ether-based host material may be a 12- to 18-crown ether-based host material containing any one or more atoms of N and S.

Specifically, the crown ether-based host material of the coating layer may be one or more selected from the group consisting of 12-crown-4 ether, 14-crown-4 ether, tetrathia-14-crown-4 ether, dibenzo-14-crown-4 ether, didecalino-14-crown-4 ether, decalino-14-crown-4 ether, 15-crown-5 ether, 16-crown-4 ether, 16-crown-5 ether, and 18-crown-6 ether.

The crown ether-based host material of the coating layer may be included at 0.1 wt % to 5.0 wt % with respect to the weight of the negative electrode active material.

When the crown ether-based host material of the coating layer is included at less than 0.1 wt % or more than 5.0 wt % with respect to the weight of the negative electrode active material, a battery life, an initial efficiency, and a fast charge efficiency may be relatively low.

In another general aspect, a negative electrode including the negative electrode active material for a lithium ion secondary battery is provided.

The negative electrode for a lithium ion secondary battery of the present disclosure includes: a current collector; and a negative electrode active material layer including the negative electrode active material, formed on the current collector.

The negative electrode for a lithium ion secondary battery may further include a crown ether-based host material layer on the negative electrode active material layer.

The crown ether-based host material layer may include a cyclic compound including two or more alkylene oxide units represented by the following Chemical Formula 1:

[Chemical Formula 1]

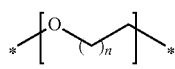

wherein n is an integer of 1 to 3.

The crown other-based host material may include a compound containing an oxygen atom (O) in a macrocyclic ring, a compound containing one or more nitrogen atoms (N) or sulfur atoms (S) in the macrocyclic ring, or a compound containing an ester or amide bond in one macrocyclic ring, and for example, the compound included in the crown other-based host material layer may have the following structures:

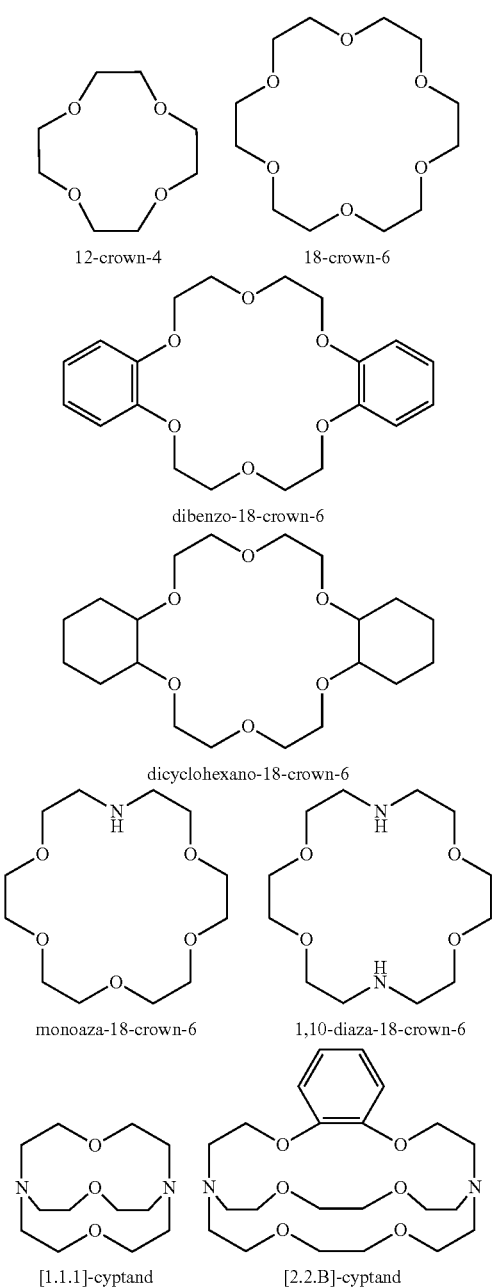

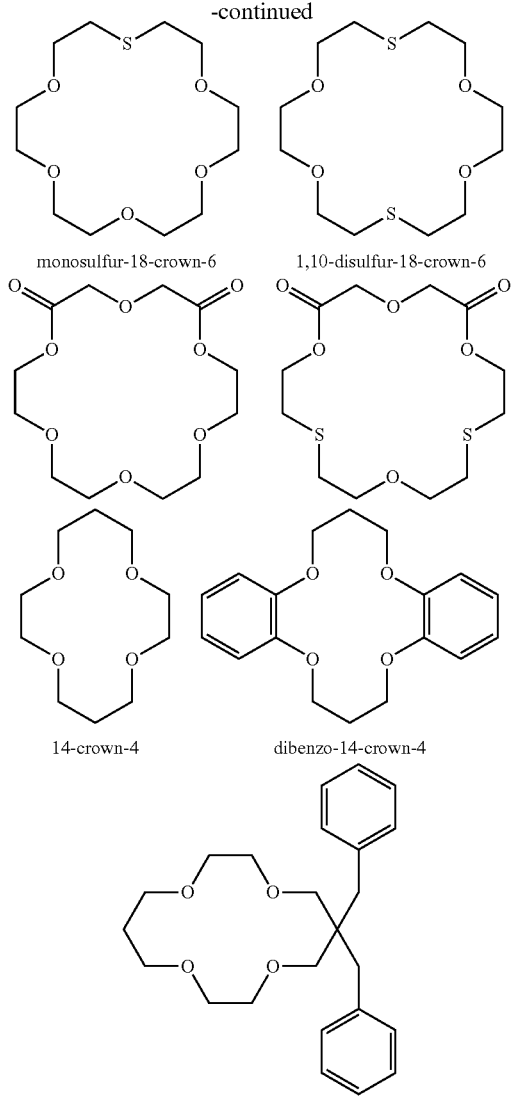

The crown ether-based host material layer may include a 12- to 18-crown ether-based host material containing any one or more atoms of N and S.

Specifically, the crown ether-based host material layer may include one or more selected from the group consisting of 12-crown-4 ether, 14-crown-4 ether, tetrathia-14-crown-4 ether, dibenzo-14-crown-4 ether, didecalino-14-crown-4 ether, decalino-14-crown-4 ether, 15-crown-5 ether, 16-crown-4 ether, 16-crown-5 ether, and 18-crown-6 ether.

The crown ether-based host material layer may be included at 0.1 wt % to 5.0 wt % with respect to the weight of the negative electrode active material layer.

When the crown ether-based host material layer is included at less than 0.1 wt % or more than 5.0 wt % with respect to the weight of the negative electrode active material layer, a battery life, an initial efficiency, and a fast charge efficiency may be relatively low.

In another general aspect, a manufacturing method of a negative electrode for a lithium ion secondary battery is provided.

The manufacturing method of a negative electrode for a lithium ion secondary battery includes: applying a negative electrode active material composition on a current collector to form a negative electrode active material layer; and forming a crown ether-based host material layer on the negative electrode active material layer.

The crown ether-based host material layer may be formed by dissolving a crown ether-based host material in one or more solvents selected from the group consisting of distilled water, methanol, ethanol, isopropyl alcohol, butanol, octanol, and N-methyl-2-pyrrolidone and applying the solution on the negative electrode active material layer.

The crown ether-based host material layer may be formed by applying the crown ether-based host material solution on the negative electrode active material layer and then drying the layer at 60° C. to 100° C. for 10 hours to 14 hours.

In still another general aspect, a lithium ion secondary battery is provided.

The lithium ion secondary battery of the present disclosure includes the negative electrode for a lithium ion secondary battery; and a positive electrode.

The lithium ion secondary battery according to the present disclosure has excellent battery life, initial efficiency, and fast charge efficiency, and thus, may be appropriate for being used in an electric vehicle (EV), a hybrid electric vehicle (HEV), or a plug-in hybrid electric vehicle (PHEV).

DETAILED DESCRIPTION OF EMBODIMENTS

Hereinafter, the present disclosure will be described in more detail. Technical terms and scientific terms used in the present specification have the general meaning understood by those skilled in the art to which the present invention pertains unless otherwise defined, and a description for the known function and configuration obscuring the present disclosure will be omitted in the following description.

In one general aspect, a negative electrode active material for a lithium ion secondary battery is provided.

The negative electrode active material for a lithium ion secondary battery of the present disclosure may include: a core layer including a metal-based or inorganic non-metal-based material; and a coating layer including a crown ether-based host material.

The metal-based or inorganic non-metal-based material of the negative electrode active material core layer for a lithium ion secondary battery may be one or more selected from the group consisting of carbon (C), silicon (Si), and a mixture thereof, and the coating layer is present as a different kind of phase (physically) on the surface of the core layer without forming a compound by a chemical bond with the crown ether-based host material of the coating layer. The composited material formed by a plurality of phases as such may effectively exert increased properties such as a battery life, initial efficiency, and fast charge efficiency. The composited material of the present specification refers to a material formed of the core layer and the coating layer, and the negative electrode active material of the present disclosure may include the composited material.

The composited material may be included at 50 wt % or more, 80 wt % or more, or 90 wt % or more with respect to the total weight of the negative electrode active material, and the negative electrode active material may be formed of the composited material (100 wt %).

The material of the core layer may be carbon materials, such as a graphite material (for example, artificial graphite, natural graphite, graphitized mesophase carbon, graphitized carbon fiber, and the like), low-crystalline carbon, and mesophase carbon, or silicon materials. The material of the core layer may be graphite, since it is easy to increase a charge/discharge capacity. The form of the graphite may be scaly, spherical, bulk, and the like. Spherical graphite may be used since a high tap density may be obtained, but the present invention is not limited thereto, and a material provided with the physical properties described above may be appropriately selected from the materials. These materials may be used alone or in combination of two or more.

An average particle diameter of the carbon material particles is not particularly limited, but may be 1 μm or more and 100 μm or less, specifically 3 μm or more and 40 μm or less, and more specifically 5 μm or more and 20 μm or less.

An average particle diameter of the silicon material particles is not particularly limited, but may be 1 nm or more and 500 nm or less, specifically 5 nm or more and 200 nm or less, and more specifically 10 nm or more and 100 nm or less.

Within the average particle diameter ranges of the carbon material particles and the silicon material particles as such, excellent capacity characteristics and life characteristics may be implemented.

Meanwhile, in the present specification, an average particle diameter refers to a value measured by a volume average value D50 (that is, a particle diameter when a cumulative volume is 50%) in particle size distribution measurement by a laser light diffraction method.

The crown ether-based host material of the coating layer may be a cyclic compound including two or more alkylene oxide units represented by the following Chemical Formula 1:

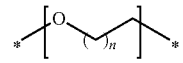

[Chemical Formula 1]

wherein
n is an integer of 1 to 3.

The crown ether-based host material of the coating layer may be selected from crown ether-based host materials containing one oxygen, two oxygens, three oxygens, or more than three oxygens, and the crown ether-based host material of the present disclosure may be a compound containing an oxygen atom (O) in a macrocyclic ring, a compound containing one or more nitrogen atoms (N) or sulfur atoms (S) in a macrocyclic ring, or a compound having an ester or amide bond in one macrocyclic ring, and for example, may have the following structures:

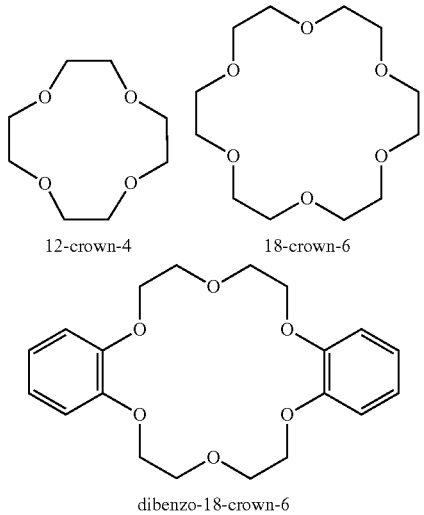

12-crown-4     18-crown-6 dibenzo-18-crown-6

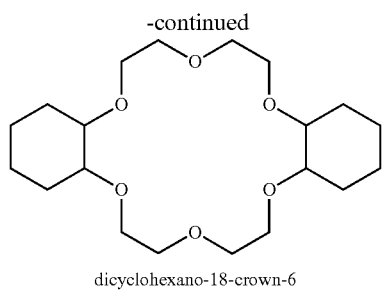
dicyclohexano-18-crown-6

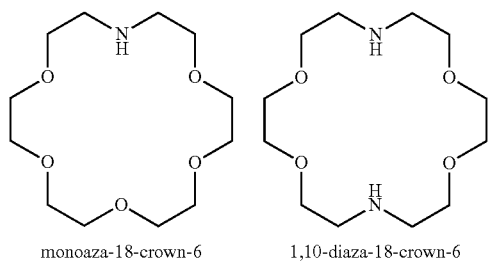
monoaza-18-crown-6    1,10-diaza-18-crown-6

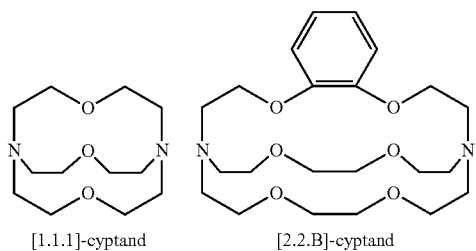
[1.1.1]-cyptand    [2.2.B]-cyptand

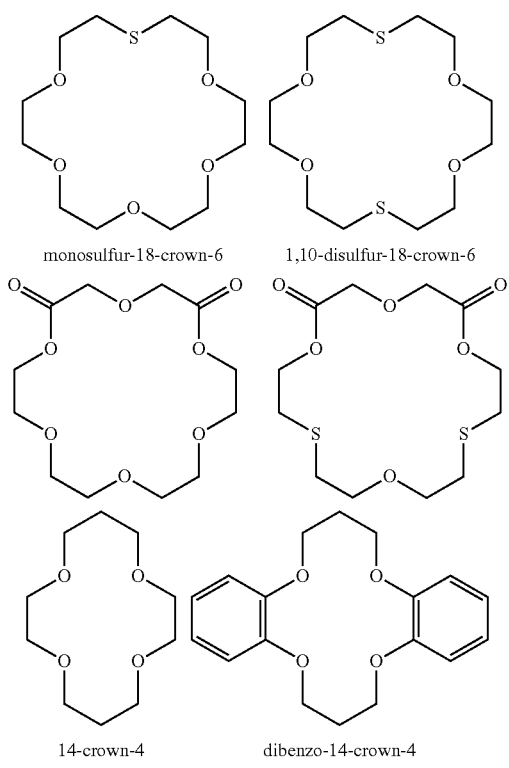
monosulfur-18-crown-6    1,10-disulfur-18-crown-6

14-crown-4    dibenzo-14-crown-4

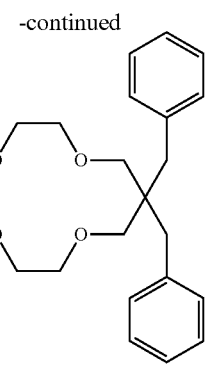

The crown other-based host material of the coating layer forms an ion-dipole bond with a metal ion to capture a metal ion, and as a result, an individual known as a host-guest complex may be produced. Herein, the crown other-based host material is a host compound, and the metal ion is a guest. For example, macrocycles such as 14-crown-4 other may form a strong complex by a chelate bond with a lithium ion.

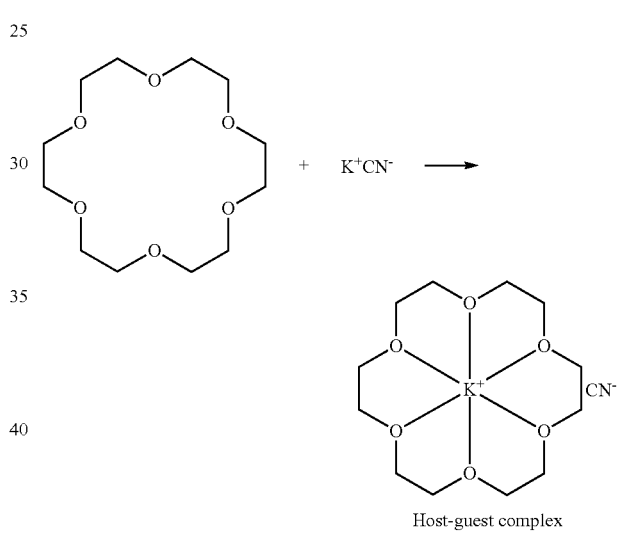
Host-guest complex

The crown ether-based host material may be a 12- to 18-crown ether-based host material containing any one or more atoms of N and S.

The crown ether-based host material of the coating layer may be one or more selected from the group consisting of 12-crown-4 ether, 14-crown-4 ether, tetrathia-14-crown-4 ether, dibenzo-14-crown-4 ether, didecalino-14-crown-4 ether, decalino-14-crown-4 ether, 15-crown-5 ether, 16-crown-4 ether, 16-crown-5 ether, and 18-crown-6 ether.

The crown ether-based host material of the coating layer may be included at 0.1 wt % to 5.0 wt % with respect to the total weight of the negative electrode active material.

When the crown ether-based host material of the coating layer is included at less than 0.1 wt % or more than 5.0 wt % with respect to the weight of the negative electrode active material, a battery life, an initial efficiency, and a fast charge efficiency may be relatively low.

The crown ether-based host material of the coating layer may be dissolved in one or more mixed solvents selected from the group consisting of distilled water, methanol, ethanol, isopropyl alcohol, butanol, octanol, and N-methyl-2-pyrrolidone.

The crown ether-based host material of the coating layer may be included at 0.1 wt % to 5 wt % with respect to the weight of dissolved solution.

The coating layer may be formed by forming a layer by coating the entire surface of the core layer or may be in a state of being partially present on the surface of the negative electrode active material.

An example of the negative electrode active material may include a graphite material forming the core layer and a composited material having the coating layer including the crown ether-based host material disposed on the surface of the graphite material.

The negative electrode active material may further include metal powder alloyed with lithium, polycomponent alloy powder including at least an element alloyed with lithium, lithium alloy powder, and the like, in addition to the composited material, and the metal of element alloyed with lithium may be one or two or more selected from the group consisting of Al, Si, Ga, Ge, In, Sn, Sb, Ag, and the like. These components may be used alone or by being added as a composite material of the composited material and the powder thereof. By using the metal powder or composite material in combination, a tap density may be greatly increased as compared with the composited material alone. Thus, the tap density of the entire negative electrode active material composition may be 0.3 g/cm$^3$ to 3.0 g/cm$^3$, and a charge/discharge reaction is accelerated to decrease negative electrode resistance to obtain good input/output characteristics. The amount in combination is not particularly limited, and for example, may be used at 1 wt % to 50 wt % in combination with respect to the weight of the negative electrode active material.

A negative electrode density of the negative electrode active material is specifically 1.3 g/cm$^3$ to 1.9 g/cm$^3$, more specifically 1.4 g/cm$^3$ to 1.8 g/cm$^3$, and particularly specifically 1.4 g/cm$^3$ to 1.7 g/cm$^3$. By having the negative electrode density of 1.3 g/cm$^3$ or more, a capacity may be increased without lowering a resistance value, and by having the negative electrode density of 1.9 g/cm$^3$ or less, deterioration of rate characteristics and cycle characteristics may be suppressed.

The manufacturing method of the negative electrode active material is not particularly limited, and any one of known methods commonly performed may be applied.

A method of forming the coating layer on the surface of the core layer is not particularly limited, but for example, a wet method of dissolving or dispersing core layer material particles are dispersed/mixed in a mixed solution in which a crown ether-based host material is dissolved or dispersed in a solvent and then removing the solvent, a dry method of mixing the solid particles and the solid crown ether-based host material and adding dynamic energy to the mixture to perform attachment, a gaseous method such as a CVD method, or the like may be included.

A method of forming the coating layer on the surface of the core layer by the wet method is not particularly limited, but for example, a mixture of the particles and the crown ether-based host material solution is filled into a container having a structure allowing mixing or stirring and mixing is performed to carry out compositeness of the material. The method may be a method of mixing and stirring in a container having a structure allowing mixing or stirring, for example, in a container having wings, screws, and the like disposed therein, and the like. Herein, the dynamic energy applied to the mixture may be 0.360 kJ/kg to 36000 kJ/kg, specifically 0.360 kJ/kg to 7200 kJ/kg, and more specifically 2.50 kJ/kg to 2000 kJ/kg per 1 kg of the mixture. Herein, the dynamic energy applied to the mixture is represented as a quotient of 'a product of a load (kW) and time (h)' divided by 'mass (kg) of the filled mixture'.

A thickness of the composited material is not particularly limited, but may be 0.01 μm or more and 10 μm or less, specifically 0.1 μm or more and 4 μm or less. When the thickness of the composited material is too large, the size of stress applied to the composited material during charge/discharge of the lithium ion secondary battery may be increased to cause deterioration of a negative electrode, thereby deteriorating the life characteristics of the secondary battery.

A thickness of the coating layer is not particularly limited, but may be 0.01 μm or more and 10 μm or less, specifically 0.1 μm or more and 5 μm or less, and more specifically 0.2 μm or more and 1 μm or less. The coating layer is positioned in the thickness range, thereby surrounding the core layer material particles to prevent the exposure of the core layer to the surface, and thus, properties such as battery life, initial efficiency, and fast charge efficiency increase may be effectively exerted.

An embodiment of the present invention is a negative electrode including the negative electrode active material for a lithium ion secondary battery.

The negative electrode for a lithium ion secondary battery of the present disclosure may include: a current collector; and a negative electrode active material layer formed on the current collector.

The negative electrode for a lithium ion secondary battery may further include a crown ether-based host material layer formed on the negative electrode active material layer.

The material and shape of the current collector are not particularly limited, but for example, may have, for example, a band shape obtained by making copper, nickel, titanium, stainless steel, and the like into a thin shape, a perforated thin shape, a mesh shape, and the like. In addition, a porous material, for example, a porous metal (foamed metal), carbon paper, or the like, may be used.

The negative electrode active material layer may be formed by kneading the negative electrode active material and an organic binder with a solvent by a dispersing device such as an agitator, a ball mill, a super sand mill, and a pressurized kneader to prepare a negative electrode active material slurry and applying the slurry on the current collector. Otherwise, the negative electrode active material layer may be obtained by a method of molding a negative electrode active material slurry in a paste form into a sheet shape, a pellet shape, or the like and integrating the shape with the current collector.

The organic binder is not particularly limited, but, for example, may include ethylenic unsaturated carbonic acid esters such as a styrene butadiene copolymer, methyl(meth)acrylate, ethyl(meth)acrylate, butyl(meth)acrylate, and (meth)acrylonitrile, hydroxyethyl(meth)acrylate, ethylenic unsaturated carbonic acids such as acrylic acid, methacrylic acid, itaconic acid, fumaric acid, and maleic acid, polymer compounds having a high ion conductivity such as polyvinylidene fluoride, polyethylene oxide, polyepichlorohydrin, polyphosphazene, and polyacrylonitrile, and the like. A content of the organic binder may be 0.5 wt % to 20 wt % with respect to the total weight of the negative electrode active material and the organic binder.

A conductive auxiliary agent may be further added to the negative electrode active material slurry. An example of the conductive auxiliary agent may include carbon black, graphite, acetylene black, an oxide or 5 nitride showing conductivity, or the like. An amount of the conductive auxiliary agent used may be 0.5 wt % to 15 wt % with respect to the negative electrode active material slurry.

A method of applying the negative electrode active material slurry to the current collector is not particularly limited, but, for example, may include a known method such as a metal mask printing method, an electrostatic painting method, a dip coating method, a spray coating method, a roll coating method, a doctor blade method, a comma coating method, a gravure coating method, and a screen printing method. After the negative electrode active material slurry is applied to the current collector, the solvent included in the negative electrode active material slurry may be dried by a hot air dryer, an infrared dryer, or a combined drier thereof. In addition, if necessary, a rolling treatment by a flat plate press, a calender roll, or the like may be performed. In addition, integration of the negative electrode active material layer molded into a sheet shape, a pellet shape, or the like and the current collector May 5 be performed by a known method such as a roll, a press, or a combination thereof. A pressure during integrating the negative electrode active material layer and the current may be, though is not limited thereto, for example, 1 MPa to 200 MPa.

A method of forming the crown ether-based host material layer on the negative electrode active material layer is not particularly limited, but for example, the layer may be attached by a wet method of applying a mixed solution in which the compound of the crown ether-based host material layer is dissolved in a solvent on the negative electrode active material layer and then removing the solvent.

The crown ether-based host material layer may include a cyclic compound including two or more alkylene oxide units represented by the following Chemical Formula 1:

[Chemical Formula 1]

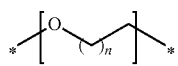

wherein n is an integer of 1 to 3.

The compound included in the crown ether-based host material layer may be selected from crown ether-based host materials containing one oxygen, two oxygens, three oxygens, or more than three oxygens, and the crown ether-based host material of the present disclosure may be a compound containing an oxygen atom (O) in a macrocyclic ring, a compound containing one or more nitrogen atoms (N) or sulfur atoms (S) in a macrocyclic ring, or a compound having an ester or amide bond in one macrocyclic ring, and for example, may have the following structures:

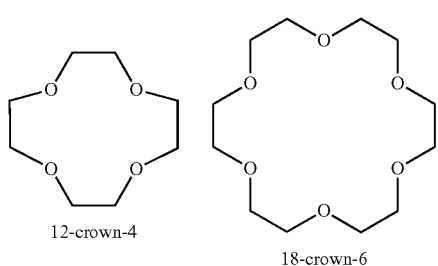

12-crown-4

18-crown-6

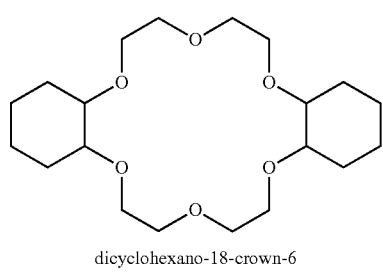

dibenzo-18-crown-6 dicyclohexano-18-crown-6

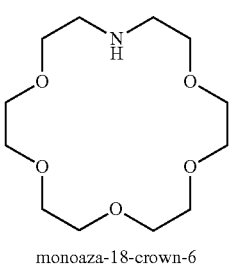 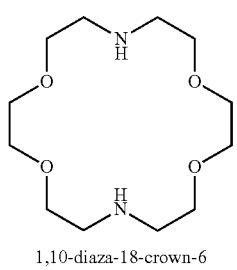

monoaza-18-crown-6     1,10-diaza-18-crown-6

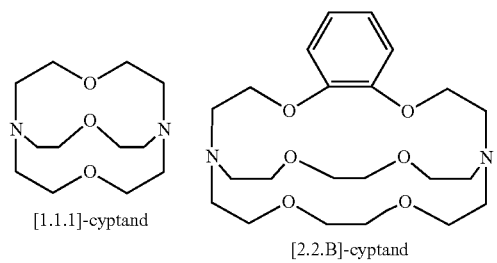

[1.1.1]-cyptand

[2.2.B]-cyptand

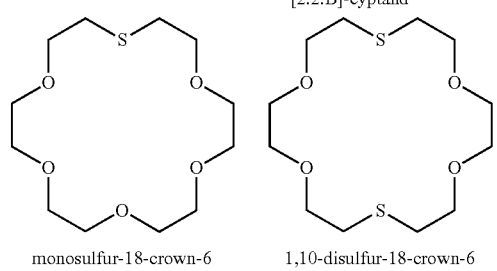

monosulfur-18-crown-6     1,10-disulfur-18-crown-6

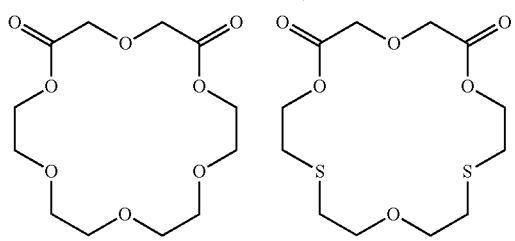

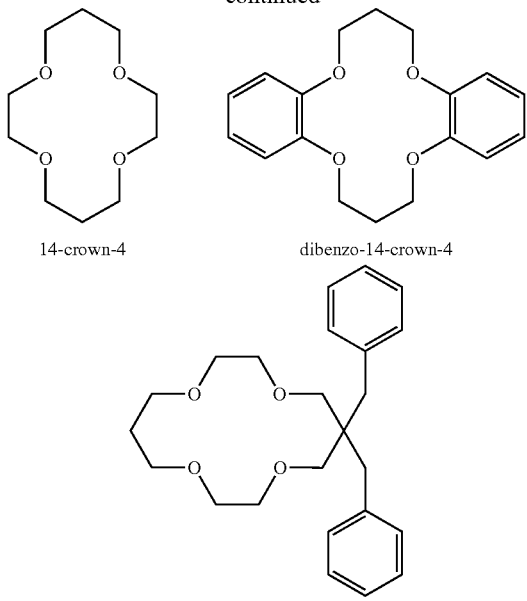

14-crown-4  dibenzo-14-crown-4

The compound of the crown ether-based host material layer forms an ion-dipole bond with a metal ion to capture a metal ion, and as a result, an individual known as a host-guest complex may be produced. Herein, the crown ether-based host material is a host compound, and the metal ion is a guest. For example, macrocycles such as 14-crown-4 ether may form a strong complex by a chelate bond with a lithium ion.

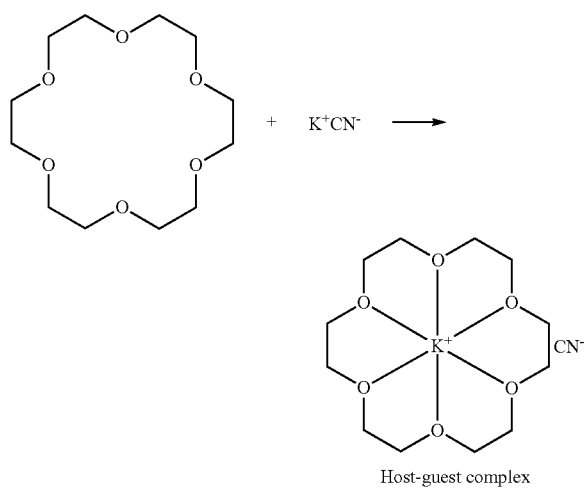

Host-guest complex

The crown ether-based host material layer may include a 12- to 18-crown ether-based host material containing any one or more atoms of N and S.

The crown ether-based host material layer may include one or more selected from the group consisting of 12-crown-4 ether, 14-crown-4 ether, tetrathia-14-crown-4 ether, dibenzo-14-crown-4 ether, didecalino-14-crown-4 ether, decalino-14-crown-4 ether, 15-crown-5 ether, 16-crown-4 ether, 16-crown-5 ether, and 18-crown-6 ether.

The crown ether-based host material layer may be included at 0.1 wt % to 5.0 wt % with respect to the weight of the negative electrode active material layer.

When the crown ether-based host material layer is included at less than 0.1 wt % or more than 5.0 wt % with respect to the weight of the negative electrode active material layer, a battery life, an initial efficiency, and a fast charge efficiency may be relatively low.

The compound of the crown ether-based host material layer may be dissolved in one or more mixed solvents selected from the group consisting of distilled water, methanol, ethanol, isopropyl alcohol, butanol, octanol, and N-methyl-2-pyrrolidone.

The compound of the crown ether-based host material layer may be included at 0.1 wt % to 5 wt % with respect to the weight of the dissolved solution.

A thickness of the crown ether-based host material layer is not particularly limited, but may be 0.01 μm or more and 10 μm or less, specifically 0.1 μm or more and 5 μm or less, and more specifically 0.2 μm or more and 1 μm or less. The crown ether-based host material layer is positioned in the thickness range, thereby surrounding the negative electrode active material layer to prevent the exposure of the negative electrode active material layer to the surface, and thus, properties such as battery life, initial efficiency, and fast charge efficiency increase may be effectively exerted.

By the structure, a lithium ion secondary battery having a high energy density and excellent input/output characteristics, life characteristics, and thermal stability may be formed. The negative electrode for a lithium ion secondary battery may include other constituent elements, if necessary, in addition to the constituent elements listed above.

An embodiment of the present invention is a manufacturing method of a negative electrode for a lithium ion secondary battery.

The manufacturing method of a negative electrode for a lithium ion secondary battery includes: applying a negative electrode active material composition on a current collector to form a negative electrode active material layer; and forming a crown ether-based host material layer on the negative electrode active material layer.

The crown ether-based host material layer may be formed by dissolving a crown ether-based host material in one or more solvents selected from the group consisting of distilled water, methanol, ethanol, isopropyl alcohol, butanol, octanol, and N-methyl-2-pyrrolidone and applying the solution on the negative electrode active material layer.

The crown ether-based host material layer may be formed by applying a solution in which the crown ether-based host organic active material is dissolved on the negative electrode active material layer and then drying the layer at 60° C. to 100° C. for 10 hours to 14 hours.

An embodiment of the present invention is a lithium ion secondary battery.

The lithium ion secondary battery of the present disclosure includes the negative electrode for a lithium ion secondary battery; and a positive electrode. The lithium ion secondary battery may further include an electrolyte provided between the negative electrode and the positive electrode. For example, the lithium ion secondary battery may be obtained by inserting a separator between the negative electrode and the positive electrode for the lithium ion secondary battery to be disposed facing each other and injecting an electrolyte solution.

The positive electrode may be obtained by a method of forming a positive electrode layer on the surface of the current collector, identically to the negative electrode. The current collector may be a band shape obtained by making a metal or alloy such as aluminum, titanium, and stainless steel into a thin shape, a perforated thin shape, a mesh shape, and the like.

The material used in the positive electrode layer is not particularly limited, and for example, may be metal compounds, metal oxides, metal sulfides, or conductive polymer materials which allows doping or intercalation of lithium ions, and in particular, though is not limited thereto, for example, lithium cobaltate ($LiCoO_2$), lithium nickelate ($LiNiO_2$), lithium manganate ($LiMnO_2$), composites thereof ($LiCo_xNi_yMn_zO_2$, x+y+z=1), and mixed oxides containing an addition element M' ($LiCo_aNi_bMn_cM'_dO_2$, a+b+c+d=1, M': Al, Mg, Ti, Zr, or Ge), lithium manganese spinel ($LiMn_2O_4$), lithium vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine type $LiMPO_4$ (M: Co, Ni, Mn, Fe), conductive polymers such as polyacetylene, polyaniline, polypyrrole, polythiophene, and polyacene, porous carbon, and the like may be used alone or in combination.

As the separator, for example, nonwoven fabric, cloth, a microporous film, or a combination thereof including polyolefin such as polyethylene and polypropylene as a main component may be used. In addition, when the lithium ion secondary battery to be manufactured has a structure in which the positive electrode and the negative electrode are not in direct contact with each other, there is no need to use the separator.

The electrolyte solution may be a solution in which a lithium salt such as $LiClO_4$, $LiPF_6$, $LiAsF_6$, $LiBF_4$, and $LiSO_3CF_3$ is dissolved in a non-aqueous solvent such as ethylene carbonate, fluoroethylene carbonate, chloroethylene carbonate, propylene carbonate, butylene carbonate, vinylene carbonate, cyclopentanone, cyclohexylbenzene, sulfolane, propanesultone, 3-methylsulfolane, 2,4-dimethylsulfolane, 3-methyl-1,3-oxazolidinon-2-one, γ-butyrolactone, dimethylcarbonate, diethylcarbonate, ethylmethyl carbonate, methylpropyl carbonate, butylmethyl carbonate, ethylpropyl carbonate, butylethyl carbonate, dipropylcarbonate, 1,2-dimethoxyethane, tetrahydrofuran, 2-methyltetrahydrofuran, 1,3-dioxolane, methyl acetate, ethyl acetate, trimethyl phosphate ester, and triethyl phosphate ester alone or a mixture of two or more thereof, which is called an organic electrolyte solution.

The structure of the lithium ion secondary battery is not particularly limited, but in a common structure, a positive electrode, a negative electrode, and a separator installed as required are wound in a flat spiral shape to form a winding type pole plate group or these are laminated in a flat plate shape to form a lamination type pole plate group, and these pole plate groups are enclosed in an exterior body.

The shape of the lithium ion secondary battery is not particularly limited, but may be a laminated battery, a paper battery, a button battery, a coin battery, a stacked battery, a cylindrical battery, a rectangular battery, or the like.

As the advantages of the lithium ion secondary battery according to the present disclosure, penetration of an electrolyte solution is rapid, it is easy to manufacture the battery, and also negative electrode expansion or a pressure rise by gas generation in the battery is small when a charge/discharge cycle is repeated, in addition to excellence in input/output characteristics, life characteristics, and thermal stability in charge/discharge. Thus, it is possible to use the negative electrode of the present disclosure in a thin lithium ion secondary battery into which it is difficult to inject an electrolyte solution or which is easily expanded by charge/discharge, such as, a laminated battery, a paper battery, a stacked battery, or a rectangular battery, among the various shapes of lithium ion secondary batteries.

A battery capacity of the thin lithium ion secondary battery may be, specifically 3.5 Ah or more, more specifically 5 Ah or more, and in particular 10 Ah or more. When a battery size is increased, it is possible to use the negative electrode of the present disclosure for suppressing battery expansion by uniformly and rapidly injecting an electrolyte solution.

In addition, in the thin lithium ion secondary battery having a battery size of length×width×thickness, when the battery is flattened or thinned so that the thickness is specifically ½ or less, more specifically ¼ or less, and in particular 1/10 or less of the shorter one of the width and the length, the effect of negative electrode expansion by a charge/discharge cycle is relatively increased, and thus, it is appropriate to use the negative electrode of the present disclosure.

The lithium ion secondary battery according to the present disclosure has excellent output/input characteristics, life characteristics, and thermal stability as compared with a conventional lithium ion secondary battery using a carbon material in a negative electrode. In particular, the thin lithium ion secondary battery using the negative electrode of the present disclosure has high input/output and low expansion, and also, when a battery pack is formed using a plurality of single batteries, has excellence in mountability and battery cooling properties.

Thus, the lithium ion secondary battery according to the present disclosure, in particular, a thin lithium ion secondary battery, has excellent battery life, initial efficiency, and fast charge efficiency, and thus, is appropriate for a use in an electric vehicle, a power tool, or the like, in particular, a use in an electric vehicle (EV), a hybrid electric vehicle (HEV), a plug-in hybrid electric vehicle (PHEV), or the like.

Hereinafter the present disclosure will be described in more detail through the following Examples.

Prior to that, terms and words used in the present specification and claims are not to be construed as a general or dictionary meaning but are to be construed as meanings and concepts meeting the technical ideas of the present disclosure based on a principle that the inventors can appropriately define the concepts of terms in order to describe their own inventions in best mode. Therefore, the configurations of the examples described herein are merely an exemplary embodiment of the present disclosure and do not represent all of the technical spirit of the present disclosure, and thus, it should be understood that there are various equivalents and modified examples to replace them at the time of filing the present disclosure.

Example 1

An ethanol solution in which 1 wt % of dibenzo-14-crown-4 ether was included with respect to the total amount of a negative electrode active material was added to artificial graphite (D50=10 um). The mixture was mixed at 20 Hz for 30 minutes in an inomixer, and then was dried under vacuum at room temperature for 12 hours or more. Thereafter, produced particles (powder) were recovered, and sieving was performed with a 325 mesh sieve to obtain a product which was the negative electrode active material of the present disclosure.

Example 2

The negative electrode active material of Example 1, carbon black (conductive material), carboxymethyl cellulose (CMC, polymer for an electrode binder), and styrene-butadiene rubber (SBR) were mixed at ratios of 94.5 wt %, 3 wt %, 1.2 wt %, and 1.5 wt % with respect to the total weight of slurry to prepare a negative electrode active material slurry. Thereafter, the slurry was coated on a copper (Cu) foil at a loading level of 13 mg/cm$^2$, and then pressed to 1.7 g/cc and hardened. On the negative electrode active material layer formed, an ethanol solution (coating solution) including 0.1 wt % of 18-crown-6 ether with respect to the total amount of the negative electrode active material layer was applied, and then drying for 12 hours in a vacuum oven at 80° C. was performed.

Example 3

A negative electrode was manufactured in the same manner as in Example 2, except that the content of 18-crown-6 ether was changed from 0.1 wt % to 0.5 wt % with respect to the total amount of the negative electrode active material layer.

Example 4

A negative electrode was manufactured in the same manner as in Example 2, except that the content of 18-crown-6 ether was changed from 0.1 wt % to 1.5 wt % with respect to the total amount of the negative electrode active material layer.

Example 5

A negative electrode was manufactured in the same manner as in Example 2, except that the 18-crown-6 ether coating solution was not applied on the negative electrode active material layer.

Example 6

A negative electrode was manufactured in the same manner as in Example 2, except that the dibenzo-14-crown-4 ether solution was not added to the negative electrode active material of Example 1.

Comparative Example 1

A negative electrode was manufactured in the same manner as in Example 2, except that the dibenzo-14-crown-4 ether solution was not added to the negative electrode active material of Example 1 and the 18-crown-6 ether coating solution was not applied on the negative electrode active material.

For measuring the performance of the negative electrodes manufactured in Examples 2 to 6 and Comparative Example 1, XRD (X-ray Diffraction) analysis results are shown in the following Table 1.

TABLE 1

| Sample name | Lc(002) | D(002) | OI(004/110) |
|---|---|---|---|
| Example 2 | 107 | 3.35 | 10.71 |
| Example 3 | 108 | 3.35 | 6.57 |
| Example 4 | 107 | 3.351 | 11.91 |
| Example 5 | 106 | 3.35 | 10.1 |
| Example 6 | 105 | 3.351 | 11.25 |
| Comparative Example 1 | 104 | 3.352 | 15.02 |

The OI value is obtained by dividing I(004) value by I(110) value, and when the OI value is decreased, a distance to the C axis is increased in XRD analysis so that it is easy to insert/extract lithium ions. Since the effect of improving output characteristics may be expected from the decrease in OI value in Table 1, according to the fact, in Examples 2 to 4 in which the crown ether-based host material was included in the negative electrode active material and the coating solution including 0.1 wt %, 0.5 wt %, or 1.5 wt % of the crown ether-based host material with respect to the total amount of the negative electrode active material layer was applied on the negative electrode active material layer, it was confirmed that the battery life was better and fast charge efficiency was excellent, and in Example 5 in which the crown ether-based host material was included in the negative electrode active material but the crown ether-based host material layer was not formed on the negative electrode active material layer and Example 6 in which the crown ether-based host material was not included in the negative electrode active material but the crown ether-based host material layer was formed on the negative electrode active material layer also, it was confirmed that battery life characteristics and fast charge efficiency characteristics were better than those of Comparative Example 1 in which the crown ether-based host material was not included in the negative electrode active material and also the crown ether-based host material layer was not formed on the negative electrode active material layer.

Example 7

Manufacture of Positive Electrode:

A lithium cobalt oxide, conductive graphite, conductive acetylene black, and polyvinylidene fluoride as an adhesive were uniformly mixed at 85 wt %, 5 wt %, 5 wt %, and 5 wt %, respectively, with respect to the total weight of the mixture, and the mixture was blended as a paste into N-methyl-2-pyrrolidone, uniformly plated on an aluminum foil, dried for 24 hours in a vacuum drier at 120° C., and stored.

Assembly of Battery:

A polypropylene (PP) porous film was placed between the poles of the positive electrode manufactured above and the negative electrode of Example 2, a general lithium battery electrolyte solution (mixed solution including dimethyl carbonate and ethylene carbonate at a volume ratio of 1:1 of 1 mol/L LiPF$_6$) was injected into the battery, and the battery was pressed and sealed.

Example 8

A coin cell battery type lithium ion secondary battery was manufactured in the same manner as in Example 7, except that the negative electrode of Example 3 was used in the assembly of the battery.

Example 9

A coin cell battery type lithium ion secondary battery was manufactured in the same manner as in Example 7, except that the negative electrode of Example 4 was used in the assembly of the battery.

Example 10

A coin cell battery type lithium ion secondary battery was manufactured in the same manner as in Example 7, except that the negative electrode of Example 5 was used in the assembly of the battery.

Example 11

A coin cell battery type lithium ion secondary battery was manufactured in the same manner as in Example 7, except that the negative electrode of Example 6 was used in the assembly of the battery.

Comparative Example 2

A coin cell battery type lithium ion secondary battery was manufactured in the same manner as in Example 7, except that the negative electrode of Comparative Example 1 was used in the assembly of the battery.

The initial capacity and efficiency characteristics of the coin cell battery type lithium ion secondary batteries manufactured in Examples 7 to 11 and Comparative Example 2 were identified and are shown in the following Table 2:

TABLE 2

| Sample name | Initial efficiency (%) | Capacity (unit: mAh/g) | | |
|---|---|---|---|---|
| | | 0.2 C | 0.5 C | 1.0 C |
| Example 7 | 94.9 | 342 | 341 | 320 |
| Example 8 | 95.3 | 343 | 342 | 337 |
| Example 9 | 94.8 | 342 | 341 | 318 |
| Example 10 | 95.0 | 342 | 341 | 319 |
| Example 11 | 94.7 | 342 | 340 | 316 |
| Comparative Example 2 | 94.2 | 341 | 339 | 305 |

According to Table 2, it was confirmed that Examples 7 to 9 using the negative electrode in which the crown ether-based host material was included in the negative electrode active material and the coating solution including the crown ether-based host material at 0.1 wt %, 0.5 wt %, or 1.5 wt %, respectively, with respect to the total weight of the negative electrode active material layer was applied on the negative electrode active material layer had highest initial efficiency and showed excellence in fast charge, and it was found that Example 10 using the negative electrode in which the crown ether-based host material was included in the negative electrode active material but the crown ether-based host material layer was not formed on the negative electrode active material layer and Example 11 using the negative electrode in which the crown ether-based host material was not included in the negative electrode active material but the crown ether-based host material layer was formed on the negative electrode active material layer also had high initial efficiency and showed excellent performance in fast charge as compared with Comparative Example 2 using the negative electrode in which the crown ether-based host material is not included in the negative electrode active material and the crown ether-based host material layer was not formed on the negative electrode active material layer.

A conventional manufacturing method of an electrode by ① coating amorphous carbon on the surface of a graphite-based active material and ② adding carbon black or fine carbon particles such as super R® as a conductive auxiliary agent or scaly graphite particles of about 1 to 3 um at 5 wt % or less to a graphite (natural/artificial)-based negative electrode active material has problems in that in ①, when a coating amount of amorphous carbon is increased, active material particle strength is increased to make implementation of high density difficult and when a coating amount of carbon is low, non-uniform coating is formed so that there is a limitation in the coating amount, and in ②, since it is difficult to uniformly disperse the conductive auxiliary agent, an additional process is needed or disadvantageous characteristics such as deterioration of storage characteristics at high temperature are shown.

The present disclosure includes an organic material which may be selectively coordinated with lithium ions, in particular, a 12- to 18-crown ether which has a cavity size similar to a lithium ion in a negative electrode active material composition and also forms a crown ether-based host material layer on a negative electrode active material layer, thereby providing a negative electrode active material for a lithium ion secondary battery having excellent battery life, initial efficiency, and fast charge efficiency by forming a solid electrolyte interphase (SEI) which is a thin and dense solid film made by a reaction with lithium ions and facilitating adsorption/desorption of lithium ions by a crown ether-based host material as a host material and a lithium ion as a guest, and a negative electrode and a lithium ion secondary battery including the same.

In addition, in an existing graphite electrode, migration of lithium ions is not easy in particular at a high rate, due to a staging phenomenon during insertion/extraction of lithium ions, thereby causing performance degradation of a battery, and thus, hard carbon is used for an application requiring high output characteristics, but hard carbon has a low capacity. In the present disclosure, a lithium ion secondary battery which facilitates insertion/extraction of lithium ions even during high rate charge/discharge and has high output performance by forming a stable crown ether-based host material layer in a polymer form on a negative electrode active material layer may be designed and manufactured, and thus, a negative electrode active material for a lithium ion secondary battery having excellent high rate charge/discharge, and a negative electrode and a lithium ion secondary battery including the same may be provided.

As described above, though the exemplary embodiments of the present disclosure have been described in detail, a person skilled in the art may make various variations of the present disclosure without departing from the spirit and the scope of the present disclosure, as defined in the claims which follow. Accordingly, any modification of the following Examples of the present disclosure may not depart from the technique of the present disclosure.

What is claimed is:

1. A negative electrode active material for a lithium ion secondary battery, comprising:
   a core layer comprising a metal-based material; and
   a coating layer comprising a crown ether-based host material,
   wherein the metal-based material is carbon (C) and does not contain silicon (Si),
   wherein the coating layer is present as a different phase on the surface of the core layer without forming a compound by a chemical bond between the metal-based material of the core layer and the crown ether-based material, and
   wherein the crown ether-based host material does not contain silane functional groups.

2. The negative electrode active material for a lithium ion secondary battery of claim 1, wherein
   the crown ether-based host material is a cyclic compound comprising two or more alkylene oxide units represented by the following Chemical Formula 1:

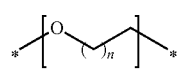

[Chemical Formula 1]

wherein
n is an integer of 1 to 3.

3. The negative electrode active material for a lithium ion secondary battery of claim 1, wherein
the crown ether-based host material is a 12- to 18-crown ether-based compound comprising any one or more atoms of N and S.

4. The negative electrode active material for a lithium ion secondary battery of claim 1, wherein
the crown ether-based host material is one or more selected from the group consisting of 12-crown-4 ether, 14-crown-4 ether, tetrathia-14-crown-4 ether, dibenzo-14-crown-4 ether, didecalino-14-crown-4 ether, decalino-14-crown-4 ether, 15-crown-5 ether, 16-crown-4 ether, 16-crown-5 ether, and 18-crown-6 ether.

5. The negative electrode active material for a lithium ion secondary battery of claim 1, wherein
the crown ether-based host material is included at 0.1 wt % to 5.0 wt % with respect to a weight of the negative electrode active material.

6. A negative electrode for a lithium ion secondary battery comprising:
a current collector; and
a negative electrode active material layer comprising the negative electrode active material of claim 1, formed on the current collector.

7. The negative electrode for a lithium ion secondary battery of claim 6, further comprising:
a crown ether-based host material layer on the negative electrode active material layer.

8. The negative electrode for a lithium ion secondary battery of claim 7, wherein
the crown ether-based host material layer comprises a cyclic compound comprising two or more alkylene oxide units represented by the following Chemical Formula 1:

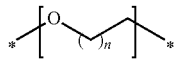

[Chemical Formula 1]

wherein
n is an integer of 1 to 3.

9. The negative electrode for a lithium ion secondary battery of claim 7, wherein
the crown ether-based host material layer comprises a 12- to 18-crown ether-based host compound comprising any one or more atoms of N and S.

10. The negative electrode for a lithium ion secondary battery of claim 7, wherein
the crown ether-based host material layer comprises one or more selected from the group consisting of 12-crown-4 ether, 14-crown-4 ether, tetrathia-14-crown-4 ether, dibenzo-14-crown-4 ether, didecalino-14-crown-4 ether, decalino-14-crown-4 ether, 15-crown-5 ether, 16-crown-4 ether, 16-crown-5 ether, and 18-crown-6 ether.

11. The negative electrode for a lithium ion secondary battery of claim 7, wherein
the crown ether-based host material layer is included at 0.1 wt % to 5.0 wt % with respect to a weight of the negative electrode active material layer.

12. A lithium ion secondary battery comprising:
the negative electrode for a lithium ion secondary battery of claim 6; and
a positive electrode.

* * * * *